United States Patent [19]

Thiessen

[11] 4,288,089
[45] Sep. 8, 1981

[54] ATTACHMENT APPARATUS FOR SIDE-BY-SIDE BICYCLES

[76] Inventor: Henry F. Thiessen, R.R. #1, 405 W. Port Ave., Buhler, Kans. 67522

[21] Appl. No.: 61,766

[22] Filed: Jul. 30, 1979

[51] Int. Cl.³ ............................................. B62K 13/06
[52] U.S. Cl. .................................................. 280/209
[58] Field of Search ........................ 280/209, 202, 273

[56] References Cited

U.S. PATENT DOCUMENTS

| | | | |
|---|---|---|---|
| 616,407 | 12/1898 | Cottrell et al. | 280/209 |
| 2,694,582 | 11/1954 | Reside | 280/209 |
| 3,836,175 | 9/1974 | Pomerance | 280/209 |

FOREIGN PATENT DOCUMENTS 83402  10/1895  Fed. Rep. of Germany ...... 280/209

Primary Examiner—John A. Pekar
Attorney, Agent, or Firm—Phillip A. Rein

[57] ABSTRACT

This invention is an attachment apparatus operable to interconnect two bicycle members in a side-by-side relationship. The attachment apparatus includes a main support coupling means to interconnect the bicycle members and a steering coordinator means to interconnect the steering mechanism on each bicycle member. The main support coupling means is connected to each steering post housing on each bicycle member to permit a constant distance between each bicycle member while permitting relative rotation therebetween. The steering coordinator means interconnects the turning forks on each bicycle member to assure joint and same turning of each front wheel member when steering the bicycle members.

9 Claims, 7 Drawing Figures

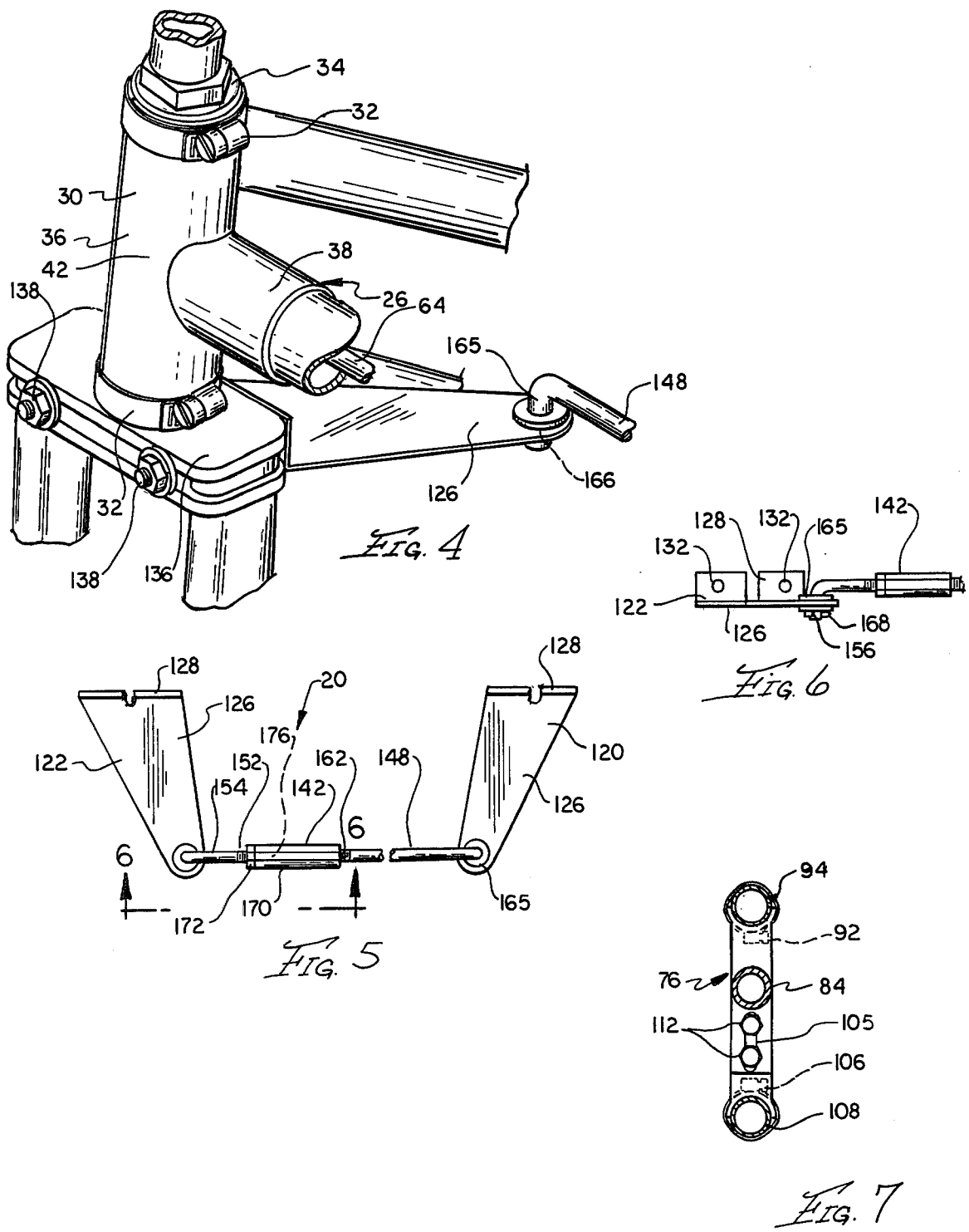

ATTACHMENT APPARATUS FOR SIDE-BY-SIDE BICYCLES

PRIOR ART

The following patents were found to be of interest relative to this invention:

U.S. Pat. No. 581,953
U.S. Pat. No. 616,407
U.S. Pat. No. 618,769
U.S. Pat. No. 2,248,223
U.S. Pat. No. 3,350,115
U.S. Pat. No. 3,768,834

The Coldwell, Cottrell et al, Singleton and Bartu patents disclose the coupling together of two (2) bicycles but are rather complex in structure and do not operate in a manner similar to our invention.

None of the cited prior art patents are deemed pertinent to the invention as described and claimed herein.

PREFERRED EMBODIMENT OF THE INVENTION

The preferred embodiment of the attachment apparatus of this invention includes two (2) independent bicycle members which can be interconnected for being ridden by two persons. The apparatus attachment includes a main support coupling means to interconnect the bicycle members and a steering coordinator means to coordinate the steering movement of each bicycle member to each other. The main support coupling means includes a horizontal connector assembly secured to inclined connector assemblies. The horizontal connector assembly maintains a constant distance separation of the bicycle members but allows relative rotation therebetween. The inclined connector assemblies includes two (2) units, each identical, and connected between respective outer ends of the horizontal connector assembly. The inclined connector assemblies provide vertical support and also prevent movement of the rear wheels of the bicycle members toward each other.

OBJECTS OF THE INVENTION

One object of this invention is to provide an attachment apparatus to interconnect bicycles in a side-by-side manner and achieve steering and peddling power by one or both of the bicycle riders.

Another object of this invention is to provide an attachment apparatus that can be provided in kit form to readily interconnect any pair of similar bicycles in a side-by-side relationship.

Still one other object of this invention is to provide an attachment apparatus to interconnect two bicycles in a side-by-side relationship but permit relative rotation of the bicycles therebetween.

Still another object of this invention is to provide an attachment apparatus to interconnect two bicycles in a side-by-side relationship and permit relative vertical movement between the bicycles.

Various other objects, advantages, and features of the invention will become apparent to those skilled in the art from the following discussion, taken in conjunction with the accompanying drawings, in which:

FIGURES OF THE INVENTION

FIG. 4 is an enlarged, fragmentary perspective view of a steering post area of a bicycle having a portion of the attachment apparatus of this invention connected thereto;

FIG. 5 is a top plan view of a steering coordinator means of the attachment apparatus of this invention;

FIG. 6 is a fragmentary side view taken along line 6—6 in FIG. 5; and

FIG. 7 is a sectional view taken along line 7—7 in FIG. 3.

Figure 1:
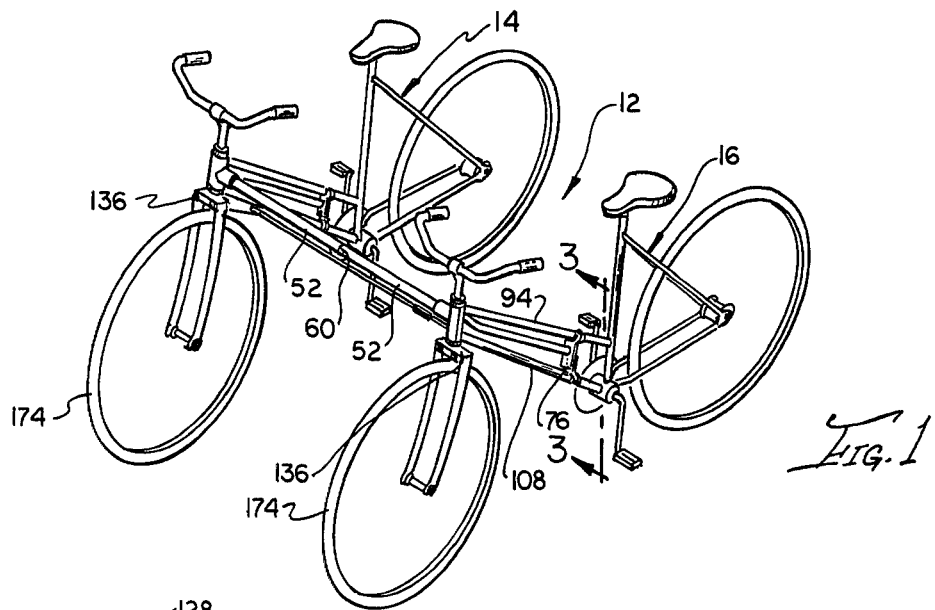
FIG. 1 is a perspective view of two bicycle members interconnected by the attachment apparatus of this invention.

The following is a discussion and description of preferred specific embodiments of the new attachment apparatus for side-by-side bicycles of this invention, such being made with reference to the drawings, whereupon the same reference numerals are used to indicate the same or similar parts and/or structure. It is to be understood that such discussion and description is not to unduly limit the scope of the invention.

DESCRIPTION OF THE INVENTION

As shown in FIG. 1, an attachment apparatus of this invention, indicated generally at 12, is used to interconnect two bicycle members 14 and 16 in a spaced relationship. The attachment apparatus 12 includes a main support coupling means 18 to interconnect the bicycle members 14, 16 and a steering coordinator means 20 to interconnect the steering mechanism of each bicycle member 14, 16.

Figure 2:
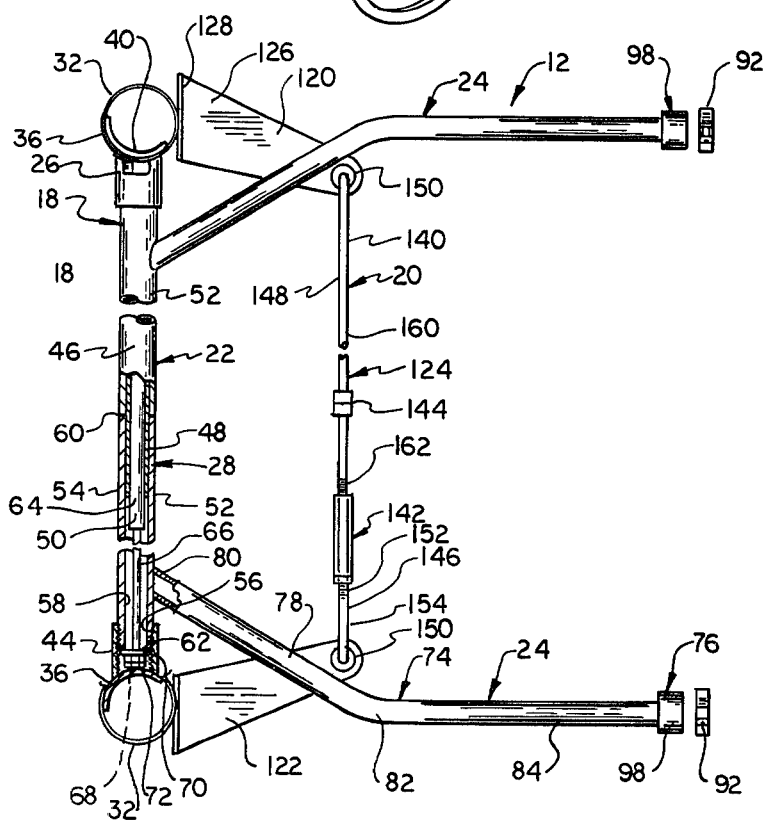
FIG. 2 is a top plan view of the attachment apparatus of this invention.

As illustrated in FIG. 2 the main support coupling means 18 includes a horizontal connector assembly 22 secured to inclined connector assemblies 24. The horizontal connector assembly 22 includes a steering post connector assembly 26 connectable to each respective bicycle member 14, 16 and a connector rod assembly 28 to interconnect each steering post connector assembly 26.

As each steering post connector assembly 26 is substantially identical, only one need be described in detail. As seen in FIGS. 2 and 4, the steering post connector assembly 26 includes a connector member 30 connected as by a pair of clamp members 32 to a steering post housing 34. The connector member 30 includes a partial tube portion 36 with a laterally extended, horizontal tube portion 38 secured thereto.

The partial tube portion 36 is constructed from a standard tube member and resembles a portion of a C-shape in transverse cross section. The partial tube portion 36 has an inner surface 40 of a diameter substantially identical to the steering post housing 34 so as to be clamped snugly thereagainst as shown in FIG. 4 by the clamp members 32.

The clamp members 32 are of a conventional nature commonly referred to as hose clamps.

The horizontal tube portion 38 is secured as by welding or the like to a central portion 42 of the partial tube portion 36 and is provided with internal threads 44 therein for connection to the connector rod assembly 28 in a manner to be described.

The connector rod assembly 28 includes (1) an outer connector tube member 46; (2) an intermediate lubrication tube 48; and (3) an inner main rod assembly 50.

The outer connector tube member 46 is formed in two separate identical structures, each referred herein as connector tube sections 52. Each connector tube section 52 includes a main body 54 having male threads 56 at one end, a central opening 58, and an outer end portion 60 that abuts the same end portion 60 on the other connector tube section 52.

The intermediate lubrication tube 48 fits in the central opening 58 between the outer connector tube member 46 and the inner main rod assembly 50. It may be constructed of teflon or other plastic materials to provide for relative rotation of the parts therein as will be explained.

As noted in FIG. 2, the inner main rod assembly 50 includes a rod assembly 60 having a connector assembly 62 at each outer end thereof.

The rod assembly 60 includes a central rod section 64 integral at each outer end with a connector rod section 66.

The central rod section 64 is of a diameter substantially similar to the inner diameter of the intermediate lubrication tube 48 to prevent lateral movement of the subject contacting parts.

Each connector rod section 66 is axially aligned and extends outwardly of the central rod section 64 and provided with male threads 68 at outer ends thereof.

Each connector assembly 62 includes a washer member 70 and two (2) nut members 72. The washer member 70 fits about the respective connector rod section 66 and abuts the respective outer ends of the connector tube sections 52.

The use of dual nut members 72 is to provide a locking feature and are mounted on the male threads 68 of the respective connector rod sections 66. The nut members 72 are adjusted to provide a compact connection of the entire connector rod assembly 28 while permitting independent rotation of the bicycle members 14, 16.

The inclined connector assemblies 24 are substantially identical so the one shown on the lower bicycle member 16 illustrated in FIG. 1 will be described in detail. Each inclined connector assembly 24 includes a support tube assembly 74 connected at a lower end to an attachment assembly 76.

The support tube assembly 74 includes an inclined tube portion 78 secured as by welding or the like at an upper end portion 80 to a respective connector tube section 52 and integral at a lower end portion 82 to a main tube portion 84.

Figure 3:
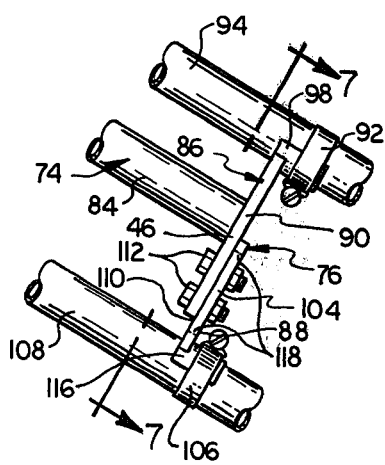
FIG. 3 is a fragmentary side view taken along line 3—3 in FIG. 1.

As best shown in FIGS. 3 and 7, the attachment assembly 76 includes an upper connector assembly 86 and a lower connector assembly 88. The upper connector assembly 86 includes an anchor plate assembly 90 connected by a clamp member 92 to an upper support tube 94 on the bicycle member 16.

The anchor plate assembly 90 includes (1) an anchor plate 96 secured at a mid portion as by welding to a lower end of the main tube portion 84; and (2) a semi-circular tube member 98 secured to an upper outer end of the anchor plate 96 and abuts the support tube 94 in a compact manner as shown in FIG. 7.

A lower end portion 102 of the anchor plate 96 is provided with an elongated slot 105 for adjustment purposes as will be explained.

The lower connector assembly 88 includes a connector plate assembly 104 connected by a clamp member 106 to a lower support tube 108 on the bicycle member 16. The connector plate assembly 104 includes a connector plate 110 and a pair of nut and bolt members 112.

The connector plate 110 has a main plate body 114 secured at an outer end to a semi-circular tube section 116. The main plate body 114 is provided with a central slot 118 for adjustment purposes as will be explained.

The nut and bolt members 112 are used to interconnect the anchor plate 96 and the connector plate 110 by insertion through the respective slots 105 and 118.

The clamp members 92 and 106 are conventional hose clamps and shown for ease of assembly but are optional and may be deleted.

The steering coordinator means 20 includes a pair of substantially identical anchor plate members 120 and 122 interconnected by a steering rod assembly 124.

The anchor plate member 120 includes a main body portion 126 integral with a vertical anchor portion 128. The main body portion 126 is constructed of a flexible plate material and resembles an airplane wing in shape. An outer end of the main body portion 126 has a hole 130 for connection to the steering rod assembly 124 as will be explained.

The vertical anchor portion 128 is provided with a pair of spaced holes 132 and a central slot 134. The holes 132 are used to secure the anchor plate member 121 to a respective steering fork 136 of the bicycle members 14, 16 by nut and bolt members 138 as noted in FIG. 4.

The other anchor plate member 122 is identical to the anchor plate member 120 except the main body portion 126 extends in the opposite direction relative to the vertical anchor portion 128 as shown in FIG. 2.

The steering rod assembly 124 includes (1) a rod assembly 140 to interconnect the anchor plate members 120 and 122; (2) an adjustment connector assembly 142 connected to the rod assembly 140; and (3) optionally, a swivel member 144 mounted on the rod assembly 140.

The rod assembly 140 includes a first rod member 146 and a second rod member 148, each interconnected by the adjustment connector assembly 142 and having a rod connector assembly 150 at outer ends thereof.

The first rod member 146 is of an L-shape having left-handed male threads 152 on an outer end of a leg portion 154 and a hole 156 in a short leg portion 158 for reasons to be explained.

The second rod member 148 is also of an L-shape but having an elongated leg section 160 with right-handed threads 162 on an outer end thereof. A short leg portion 164 has a hole 166 in the outer end thereof for reasons to be explained.

The rod connector assembly 150 includes a rubber grommet member 165 mounted in respective holes 156, 166 in the main body portions 126 of the anchor plate members 120 and 122, and a cotter pin 168 mounted in respective holes 156 and 166 in the first and second rod members 146, 148. (FIG. 6)

The adjustment connector assembly 142 includes a rod connector member 170 and a lock nut 172. The rod connector member 170 is of sufficient length to provide adjustment of the steering forks 136 on the bicycle members 14 and 16 to assure that front wheels 174 are parallel. The rod connector member 170 is provided internally with left and right-handed female threads 176 so that rotation of the connector member 170 operates to move the steering forks 136 toward or away from each other to achieve the required parallel relationship of the front wheels 174.

The swivel member 144 is of a conventional nature and allows relative rotation between the first rod member 146 and the second rod member 148.

USE AND OPERATION OF THE INVENTION

The attachment apparatus of this invention is used to interconnect two (2) bicycle members 14 and 16 of substantially the same height and manufacture. Although shown as installed on girls' bicycles, the attachment assembly 12 could be altered slightly for interconnecting boys' bicycle members.

First, the connector rod assembly 28 is assembled as shown in FIG. 1 and the connector tube sections 52 are screwed on the outer connector member 30 at each outer end. The connector members 30 are then secured to respective steering post housing 34 of the bicycle members 14 and 16 by the clamp members 32.

Next, the inclined connector assemblies 24 are mounted as shown in FIG. 3 between the support tubes 94 and 108. The nut and bolt members 112 are tightened to achieve a firm clamping of the attachment assembly 12 between the support tubes 94 and 108.

The steering coordinator means 20 is then mounted between the bicycle members 14 and 16 with the anchor plate members 120 and 122 secured by the nut and bolt members 138 to the respective steering fork 136.

The steering rod assembly 124 is mounted between the main body portions 126 of the anchor plate members 120 as shown in FIG. 2. The adjustment connector assembly 142 has the rod connector member 170 being rotatable to a position wherein the front wheel members 174 of the bicycle members 14 and 16 are parallel. The lock nut 172 is tightened against the rod connector member 170 to maintain the adjusted position.

Therefore, it is seen that the turning or steering of one bicycle member 14 or 16 is such as to coordinate with each other by use of the steering rod assembly 124.

The horizontal connector assembly 22 is formed with the separate connector tube sections 52 to permit independent rotational movement of the bicycle members 14 and 16. Also, independent movement is achieved in the steering coordinator means 20 by (1) connection of outer ends of the rod assembly 140 in the respective rubber grommet members 165; and (2) the flexibility of the main body portion 126 of each of the anchor plate members 120.

Also, relative rotational movement of the bicycle members 14 and 16 is achieved by rotation of the second rod member 148 of the rod assembly 140 in the adjustment connector assembly 142.

It is noted that an important feature of this invention is to permit relative independent rotation of the interconnected bicycle members which is benficial if on uneven terrain, when running over rocks, holes, or depressions in the supporting surface, etc. Actual testing of the invention in maintaining control of the interconnected bicycle members has proven quite satisfactory over the prior art devices.

While the invention has been described in conjunction with preferred specific embodiments thereof, it will be understood that this description is intended to illustrate and not to limit the scope of the invention, which is defined by the following claims.

I claim:

1. An attachment apparatus for interconnecting side-by-side bicycle members, comprising:
   (a) a main support coupling means to interconnect said bicycle members, including a horizontal connector assembly and an inclined connector assembly connected between said horizontal connector assembly and respective ones of said bicycle members;
   (b) a steering coordinator means connected between a steering mechanism on each of said bicycle members to achieve conjoint movement of front wheel members on each of said bicycle members;
   (c) said horizontal connector assembly includes a steering post connector assembly mounted on each of said bicycle members and interconnected to each other by a connector rod assembly;
   (d) said connector rod assembly includes an outer connector tube member formed in two connector tube sections, each secured to respective ones of said steering post connector assemblies with said connector tube sections rotatable relative to each other and allows independent rotational movement of said bicycle members; and
   (e) said connector rod assembly includes an inner main rod assembly rotatably connected to said outer connector tube member to maintain the spaced relationship of said bicycle members.

2. The attachment apparatus as described in claim 1, wherein:
   (a) said steering coordinator means includes an anchor plate member secured to each of said steering mechanisms, a steering rod assembly connected between said anchor plate members and an adjustment connector assembly mounted on said steering rod assembly;
   (b) said adjustment connector assembly rotatable to achieve a parallel relationship of said front wheel members on said bicycle member; and
   (c) said anchor plate members each having an elongated, flexible main body portion with a hole in the outer ends thereof for connection to said steering rod assembly and permits vertical, flexible movement therebetween.

3. An attachment apparatus for interconnecting side-by-side bicycle members, comprising:
   (a) a main support coupling means to interconnect said bicycle members, including a horizontal connector assembly and an inclined connector assembly connected between said horizontal connector assembly and respective ones of said bicycle members;
   (b) a steering coordinator means connected between a steering mechanism on each of said bicycle members to achieve conjoint movement of front wheel members on each of said bicycle members;
   (c) said horizontal connector assembly includes a steering post connector assembly mounted on each of said bicycle members and interconnected to each other by a connector rod assembly;
   (d) said connector rod assembly includes an outer connector tube member which allows independence rotational movement of said bicycle members;
   (e) said steering post connector assembly includes a connector member mounted against each respective steering housing of each of said bicycle members by clamp members;
   (f) each of said connector members having a laterally extended horizontal tube portion for connection to said connector rod assembly;
   (g) said connector rod assembly includes said outer connector tube member secured at outer ends to respective ones of said horizontal tube portions and an inner main rod assembly connected to said outer connector tube member to maintain the spaced relationship of said bicycle members; and (h) said outer connector tube member constructed in half sections to permit relative rotational movement therebetween.

4. The attachment apparatus as described in claim 3, wherein:

(a) said inner main rod assembly includes a rod assembly having a connector assembly at each outer end thereof; and (b) said rod assembly extends the length of said outer connector tube member and said connector assembly abuts each outer end of said outer connector tube member to hold said half sections in abutting relationship but permitting relative rotation of said inner main rod assembly.

5. The attachment apparatus as described in claim 4, wherein:

(a) said connector rod assembly includes an intermediate lubrication tube mounted between said outer connector member and said inner main rod assembly to provide lubrication for relative rotational movement therebetween.

6. The attachment apparatus as described in claim 3, wherein:

(a) each of said inclined connector assemblies includes a support tube assembly having one end secured to respective ones of said half sections of said outer connector tube member and a lower end is secured to an attachment assembly; and (b) said attachment assembly mounted between two support tubes on each of said bicycle members.

7. The attachment apparatus as described in claim 6, wherein:

(a) said attachment assembly having an upper connector assembly and a lower connector assembly to abut said support tubes and held in an expanded clamped relationship by a pair of nut and bolt members.

8. The attachment apparatus as described in claim 3, wherein:

(a) said steering coordinator means includes an anchor plate member secured to each of said steering mechanisms, a steering rod assembly connected between said anchor plate members, and an adjustment connector assembly mounted on said steering rod assembly;

(b) said adjustment connector assembly rotatable to achieve a parallel relationship of said front wheel members on said bicycle members; and (c) said anchor plate members each having an elongated, flexible main body portion with a hole in the outer ends thereof for connection to said steering rod assembly and permits vertical, flexible movement therebetween.

9. The attachment apparatus as described in claim 8, wherein:

(a) said steering rod assembly includes a rod assembly having a swivel member mounted thereon to permit relative rotation movement of portions of said rod assembly.

* * * * *